US010166705B2

(12) United States Patent
Yukimura et al.

(10) Patent No.: US 10,166,705 B2
(45) Date of Patent: Jan. 1, 2019

(54) METHOD OF MANUFACTURING HOUSING STRUCTURE AND HOUSING STRUCTURE

(71) Applicant: JTEKT CORPORATION, Osaka-shi, Osaka (JP)

(72) Inventors: Takahiro Yukimura, Kashiba (JP); Noriaki Matsui, Kashihara (JP); Akihiro Takeuchi, Kashiba (JP); Hiroshi Kutsumi, Takarazuka (JP); Shoichi Koyama, Yamatotakada (JP); Fu Yao, Kashiba (JP); Toshihiro Moriuchi, Kawachinagano (JP); Kensaku Hotta, Kashihara (JP); Satoshi Haraguchi, Kyoto (JP); Yuki Kosumi, Kashiba (JP); Masafumi Kajitani, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/492,452

(22) Filed: Apr. 20, 2017

(65) Prior Publication Data
US 2017/0312955 A1    Nov. 2, 2017

(30) Foreign Application Priority Data

Apr. 27, 2016  (JP) ................................ 2016-089447
Nov. 21, 2016  (JP) ................................ 2016-226217

(51) Int. Cl.
*H05K 3/30* (2006.01)
*B29C 45/14* (2006.01)
(Continued)

(52) U.S. Cl.
CPC .... *B29C 45/14336* (2013.01); *B29C 45/0046* (2013.01); *B29C 45/14065* (2013.01);
(Continued)

(58) Field of Classification Search
CPC ............. B29C 45/14336; B29C 45/26; B29C 45/0046; B29C 2045/2691; B62D 5/0409;
(Continued)

(56) References Cited

U.S. PATENT DOCUMENTS 5,044,912 A   9/1991  Billings et al.
5,133,921 A   7/1992  Yokoyama
(Continued)

FOREIGN PATENT DOCUMENTS

DE   10 2013 114136 A1   6/2015
EP      2 082 858 A1     7/2009
(Continued)

OTHER PUBLICATIONS

Sep. 19, 2017 Search Report issued in European Patent Application No. 17167593.7.
(Continued)

*Primary Examiner* — Donghai D Nguyen
(74) *Attorney, Agent, or Firm* — Oliff PLC

(57) ABSTRACT

A mold for insert molding, which houses an electronic unit including a first circuit portion and a second circuit portion protruding from the first circuit portion, is prepared. The mold includes an upper wall surface facing an upper surface of the second circuit portion and side wall surfaces facing side surfaces of the second circuit portion. The flow resistance of a resin flowing through a space between each side surface of the second circuit portion and the corresponding side wall surface is lower than that of the resin flowing through a space between the upper surface of the second circuit portion and the upper wall surface. Then, the electronic unit is placed in the mold. Then, the resin is injected into the mold in which the electronic unit has been placed. Thus, the electronic unit and the housing in which the electronic unit is housed are integrated with each other.

8 Claims, 11 Drawing Sheets

(51) Int. Cl.
*B29C 45/00* (2006.01)
*B29C 45/26* (2006.01)
*G01L 3/10* (2006.01)
*G01L 5/22* (2006.01)
*B29L 31/34* (2006.01)

(52) U.S. Cl.
CPC .. *B29C 45/14639* (2013.01); *B29C 45/14836* (2013.01); *B29C 45/26* (2013.01); *G01L 3/104* (2013.01); *G01L 5/221* (2013.01); *B29C 2045/14122* (2013.01); *B29C 2045/2691* (2013.01); *B29L 2031/3481* (2013.01); *Y10T 29/49146* (2015.01)

(58) Field of Classification Search
CPC .. G01L 5/221; G01L 3/104; B29L 2031/3481; Y10T 29/49128; Y10T 29/4913; Y10T 29/49146; Y10T 29/49158
USPC .......................... 29/830, 832, 841, 846, 848
See application file for complete search history.

(56) References Cited

U.S. PATENT DOCUMENTS

| | | | |
|---|---|---|---|
| 6,516,915 B2* | 2/2003 | Kurokawa | B62D 5/0409 180/444 |
| 9,255,857 B2* | 2/2016 | Hotta | G01L 3/104 |
| 2002/0005773 A1 | 1/2002 | Uchiyama | |
| 2002/0080077 A1 | 6/2002 | Kamei et al. | |
| 2006/0237871 A1 | 10/2006 | Uchida | |
| 2009/0134864 A1 | 5/2009 | Hofler et al. | |
| 2011/0279002 A1 | 11/2011 | Han et al. | |
| 2015/0033877 A1 | 2/2015 | Hotta et al. | |

FOREIGN PATENT DOCUMENTS

| | | |
|---|---|---|
| JP | S59-81126 A | 5/1984 |
| JP | H09-121005 A | 5/1997 |
| JP | 2002-103407 A | 4/2002 |
| JP | 2008-238596 A | 10/2008 |
| JP | 2011-102769 A | 5/2011 |
| JP | 2011-153697 A | 8/2011 |
| JP | 2012-151404 A | 8/2012 |
| JP | 2012-176601 A | 9/2012 |
| JP | 2014-216782 A | 11/2014 |
| JP | 2015-031600 A | 2/2015 |
| WO | 03/071475 A2 | 8/2003 |
| WO | 2015-075915 A1 | 5/2015 |

OTHER PUBLICATIONS

Yorgensen H.P., "Designing Insert-Molded Parts", Machine Design, vol. 60, No. 22, pp. 115-118, 1988.
Jan. 19, 2018 Extended Search Report issued in European Patent Application No. 17167593.7.

* cited by examiner

METHOD OF MANUFACTURING HOUSING STRUCTURE AND HOUSING STRUCTURE

INCORPORATION BY REFERENCE

The disclosure of Japanese Patent Application No. 2016-089447 filed on Apr. 27, 2016 and Japanese Patent Application No. 2016-226217 filed on Nov. 21, 2016, each including the specification, drawings and abstract, is incorporated herein by reference in its entirety.

BACKGROUND OF THE INVENTION

1. Field of the Invention

The invention relates to a method of manufacturing a housing structure, and relates also to a housing structure.

2. Description of the Related Art

Insert molding is widely known as a method of integrally molding a member and a housing that houses the member. Insert molding is a process in which a resin is injected into a mold with the member placed in the mold, and the member and the housing are integrally molded into a single component. Japanese Patent Application Publication No. 2015-031600 (JP 2015-031600 A) describes a torque detecting device including an outer housing. The outer housing is molded by injecting a molding material into a mold in which a sensor unit has been placed. Thus, the sensor unit and the outer housing that houses the sensor unit are integrally molded into a single component. The sensor unit includes a magnetic convergence ring holder having a cylindrical shape and a case. The magnetic convergence ring holder is integrated with magnetic convergence rings. The case extends radially outward from the magnetic convergence ring holder.

Under the technology described in JP 2015-031600 A, during a process of molding the outer housing with the sensor unit placed in the mold, that is, during insert molding, the case of the sensor unit extending radially outward from the magnetic convergence ring holder may be deformed by a force (resin pressure) applied from a resin flowing in the mold along an upper surface of the case.

SUMMARY OF THE INVENTION

One object of the invention is to provide a housing structure configured to suppress deformation of an electronic unit during insert molding, and a method of manufacturing the housing structure.

An aspect of the invention relates to a method of manufacturing a housing structure that includes an electronic unit including a first circuit portion and a second circuit portion protruding from the first circuit portion, and a housing in which the electronic unit is housed, the electronic unit and the housing being integral with each other. The method includes: preparing a mold for insert molding in which the electronic unit is housed, the mold including an upper wall surface facing an upper surface of the second circuit portion and side wall surfaces facing side surfaces of the second circuit portion, the mold being configured such that a flow resistance of a resin flowing through a space between each of the side surfaces of the second circuit portion and the corresponding side wall surface is lower than a flow resistance of the resin flowing through a space between the upper surface of the second circuit portion and the upper wall surface; placing the electronic unit in the mold; and injecting the resin into the mold in which the electronic unit has been placed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
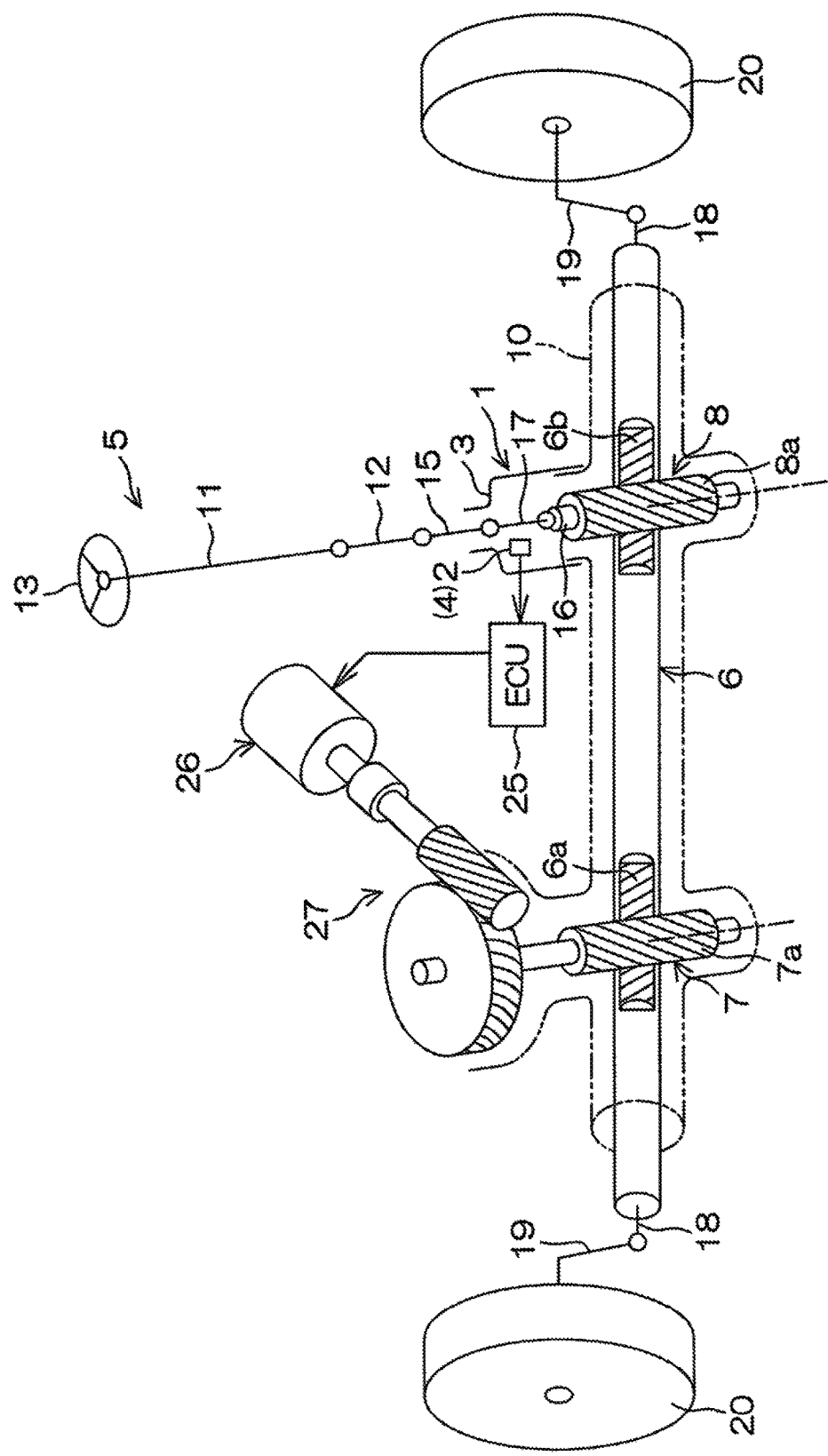
FIG. 1 is a schematic diagram illustrating the schematic configuration of an electric power steering system including a housing structure according to an embodiment of the invention.

Hereinafter, example embodiments of the invention will be described in detail with reference to the accompanying drawings. FIG. 1 is a schematic diagram illustrating the schematic configuration of an electric power steering system 5 including a housing structure 1 according to an embodiment of the invention. The housing structure 1 includes an electronic unit 2 and a housing 3 that houses the electronic unit 2. The electronic unit 2 and the housing 3 are integrated with each other. The electronic unit 2 is a sensor unit used, for example, as a torque sensor 4 mounted in a vehicle. The housing 3 is, for example, a sensor housing that houses the torque sensor 4.

The electric power steering system 5 provided with the torque sensor 4 is, for example, a dual-pinion electric power steering system. The electric power steering system 5 includes a first pinion shaft 7 and a second pinion shaft 8.

The first pinion shaft 7 has a first pinion 7a that meshes with a first rack 6a of a rack shaft 6. The first pinion shaft 7 is used to transmit a steering assist force. The second pinion shaft 8 has a second pinion 8a that meshes with a second rack 6b of the rack shaft 6. The second pinion shaft 8 is used to transmit a manual steering force.

The housing 3 is attached to, for example, a rack housing 10 in which the rack shaft 6 is housed. The torque sensor 4 is attached to, for example, the second pinion shaft 8. The second pinion shaft 8 includes an input shaft 15, an output shaft 16, and a torsion bar 17. The input shaft 15 is coupled to a steering wheel 13 via a steering shaft 11 and an intermediate shaft 12. The output shaft 16 has the second pinion 8a. The torsion bar 17 couples the input shaft 15 and the output shaft 16 to each other such that the input shaft 15 and the output shaft 16 are coaxial with each other. The input shaft 15 and the output shaft 16 are rotatable relative to each other within a prescribed angular range.

Steered wheels 20 are coupled to respective ends of the rack shaft 6 via tie rods 18 and knuckle arms 19. In response to a driver's operation of the steering wheel 13, the steered wheels 20 are steered via the steering shaft 11, the intermediate shaft 12, the second pinion shaft 8, the rack shaft 6, the tie rods 18, and the knuckle arms 19. As the driver operates the steering wheel 13 in order to steer the steered wheels 20, the input shaft 15 and the output shaft 16 of the second pinion shaft 8 rotate relative to each other, so that the torsion bar 17 is twisted.

The torque sensor 4 detects a torsion amount of the torsion bar 17 of the second pinion shaft 8. A detection signal from the torque sensor 4 is provided to an electronic control unit (ECU) 25. The ECU 25 controls driving of an electric motor 26 using an embedded driving circuit, based on, for example, a detected torque signal, and a detected vehicle speed signal from a vehicle speed sensor (not illustrated). The speed of rotation output from the electric motor 26 is reduced by a speed reducer 27. Then, the rotation having a reduced speed is transmitted to the first pinion shaft 7, and is converted into a linear motion of the rack shaft 6. In this way, a driver's steering operation is assisted.

Figure 2:
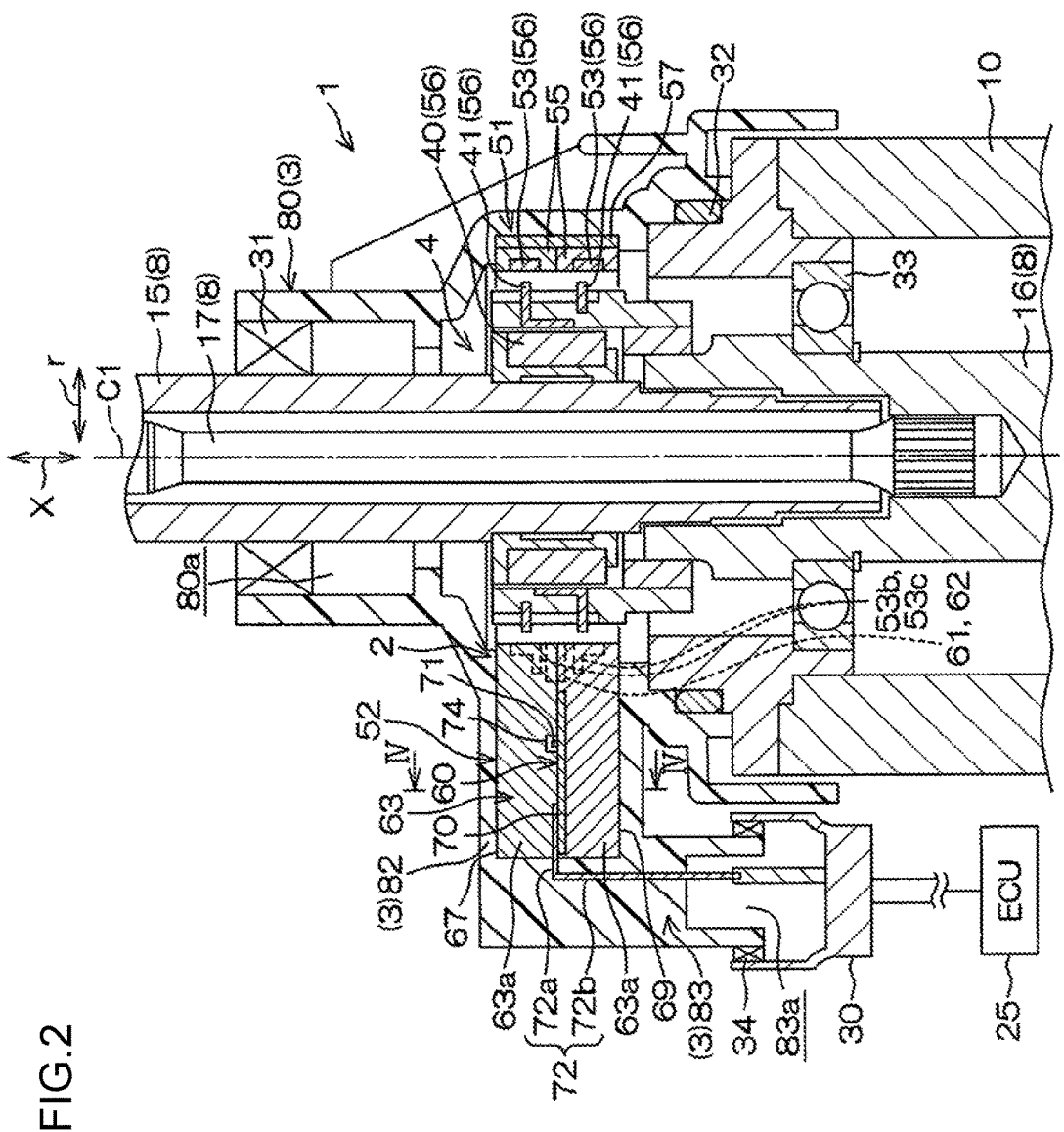
FIG. 2 is a schematic sectional view of the housing structure and its surroundings.
Figure 3:
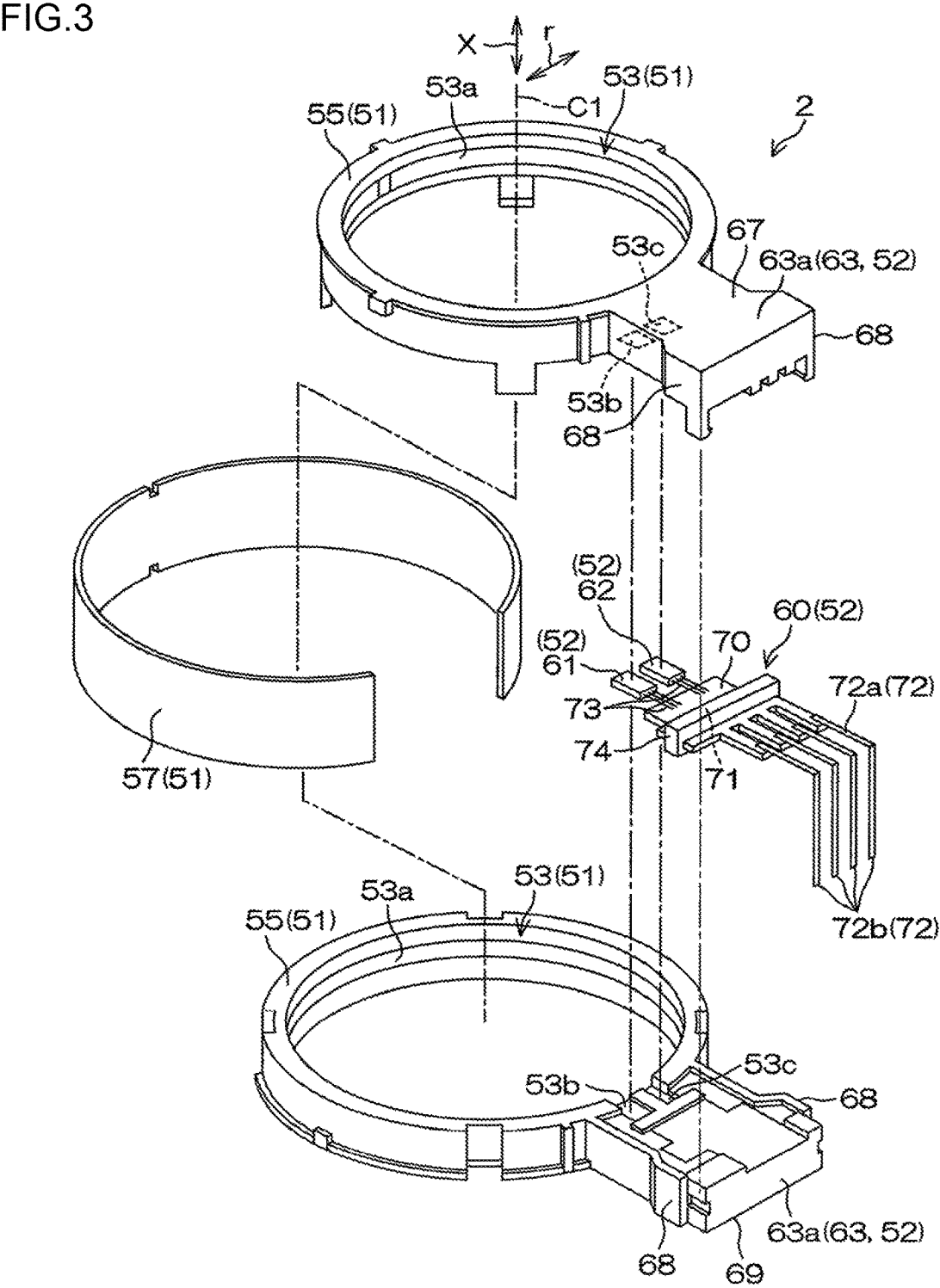
FIG. 3 is an exploded perspective view of an electronic unit.

The configuration of the housing structure 1 will be described below in detail. FIG. 2 is a schematic sectional view of the housing structure 1 and its surroundings. FIG. 3 is an exploded perspective view of the electronic unit 2. The torque sensor 4, which is the electronic unit 2 of the housing structure 1, further includes a permanent magnet 40 and a pair of magnetic yokes 41. The magnetic yokes 41 are magnetically coupled to the permanent magnet 40. The permanent magnet 40 is concentrically fixed to the input shaft 15 so as to rotate together with the input shaft 15 in an integrated manner. The magnetic yokes 41 are concentrically fixed to the output shaft 16 so as to rotate together with the output shaft 16 in an integrated manner. As the input shaft 15 and the output shaft 16 rotate relative to each other, the positions of the magnetic yokes 41 relative to the permanent magnet 40 vary, resulting in magnetic flux variations.

The electronic unit 2 is electrically connected to the ECU 25, and detects magnetic fluxes from the magnetic yokes 41. The electronic unit 2 includes a first circuit portion 51 having an annular shape. The first circuit portion 51 has a central axis C1 that coincides with a central axis of the input shaft 15. A radial direction centered at the central axis C1 will be referred to as "radial direction r". A direction included in the radial direction r and extending toward the central axis C1 will be referred to as "radially inward direction". A direction included in the radial direction r and extending away from the central axis C1 will be referred to as "radially outward direction". A direction along which the central axis C1 extends will be referred to as "axial direction X". The electronic unit 2 further includes a second circuit portion 52 having a block shape and protruding radially outward from an outer periphery of the first circuit portion 51. The second circuit portion 52 is supported, as a cantilever portion, by the first circuit portion 51.

The first circuit portion 51 includes a pair of magnetic convergence rings 53, a pair of magnetic convergence ring holders 55 having an annular shape, and a magnetic shield 57 having a C-shape. Each of the magnetic convergence rings 53 is magnetically coupled to a corresponding one of the magnetic yokes 41. Each of the magnetic convergence ring holders 55 holds a corresponding one of the magnetic convergence rings 53. The magnetic shield 57 reduces the impact that the external magnetic fields exert on a magnetic circuit 56 formed by the magnetic convergence rings 53, the magnetic yokes 41, and the permanent magnet 40. The magnetic shield 57 is disposed around the magnetic convergence ring holders 55.

The second circuit portion 52 is an electronic circuit portion including an electronic component 60. Specifically, the second circuit portion 52 includes a first magnetic element 61, a second magnetic element 62, the electronic component 60, and a holder 63. The first magnetic element 61 and the second magnetic element 62 output signals corresponding to magnetic fluxes of the magnetic circuit 56. The electronic component 60 is electrically connected to the magnetic elements 61, 62. The holder 63 houses and holds the magnetic elements 61, 62 and the electronic component 60. The magnetic elements 61, 62 are, for example, Hall ICs. In the sectional view in FIG. 2, the magnetic elements 61, 62 are indicated by dashed lines for convenience of description, but the magnetic elements 61, 62 are not supposed to appear in the drawing. The magnetic fluxes that are varied depending on the variations in the positions of the magnetic yokes 41 relative to the permanent magnet 40 are guided to the magnetic elements 61, 62 by the magnetic convergence rings 53.

Each of the magnetic convergence rings 53 includes an annular portion 53a, a first element facing portion 53b, and a second element facing portion 53c. The first element facing portion 53b protrudes radially outward from the annular portion 53a so as to face the first magnetic element 61. The second element facing portion 53c protrudes radially outward from the annular portion 53a so as to face the second magnetic element 62. Each magnetic convergence ring 53 is integrated with the corresponding magnetic convergence ring holder 55, by molding a resin of the magnetic convergence ring holder 55 around the magnetic convergence ring 53. The magnetic convergence ring 53 and the magnetic convergence ring holder 55 form an annular shape as a whole. The magnetic convergence ring 53 is generally annular. Each magnetic convergence ring holder 55 and each magnetic convergence ring 53 concentrically surround the outer periphery of the corresponding magnetic yoke 41 in a noncontact manner. The first magnetic element 61 is disposed between the first element facing portions 53b of the magnetic convergence rings 53. The second magnetic element 62 is disposed between the second element facing portions 53c of the magnetic convergence rings 53.

The electronic component 60 includes a substrate 70 and a capacitor 71 mounted on the substrate 70. Terminals 72 made of metal are electrically connected to the substrate 70. Each of the terminals 72 includes a first portion 72a and a second portion 72b. The first portion 72a is coupled to the substrate 70 so as to extend in the radial direction r. The second portion 72b extends downward from a distal end portion of the first portion 72a. A part of each terminal 72 (a distal end portion of the first portion 72a and the second portion 72b) are disposed outside the holder 63 in the radial direction. The electronic component 60 further includes pins 73 that couple the magnetic elements 61, 62 and the substrate 70 together, and a cover 74 with which the capacitor 71 is covered.

The holder 63 is made of a resin, and is in the form of a block (a generally rectangular parallelepiped) extending outward in the radial direction. The holder 63 includes a pair of halves 63a engaged with each other with the electronic component 60 disposed therebetween. Each of the halves 63a is formed so as to be integral with the corresponding magnetic convergence ring holder 55. The housing 3 surrounds the input shaft 15 of the second pinion shaft 8. The housing 3 includes a main body portion 80, a holder holding portion 82, and a connector portion 83 that are made of a single material and that are formed so as to be integral with each other. The main body portion 80 has an internal space 80a in which the magnetic convergence rings 53 and the magnetic convergence ring holders 55 are housed. The holder holding portion 82 protrudes radially outward from the outer peripheral surface of the main body portion 80, and holds the holder 63. The connector portion 83 extends from a protruding end of the holder holding portion 82. A connector 30 having a waterproof property is fitted to the connector portion 83. The connector portion 83 has an internal space 83a in which distal end portions of the second portions 72b of the terminals 72 are disposed. When the connector 30 is connected to the connector portion 83, the second portions 72b of the terminals 72 are electrically connected to the ECU 25.

The housing 3 is kept watertight by a seal member 31, a seal member 32, a bearing 33, and a seal member 34, so that entry of liquid into the housing 3 is prevented. The seal member 31 is provided between the main body portion 80 and the input shaft 15. The seal member 32 is provided between the main body portion 80 and the rack housing 10. The bearing 33 is provided between the rack housing 10 and the output shaft 16. The seal member 34 is provided between the connector 30 and the connector portion 83.

Figure 4:
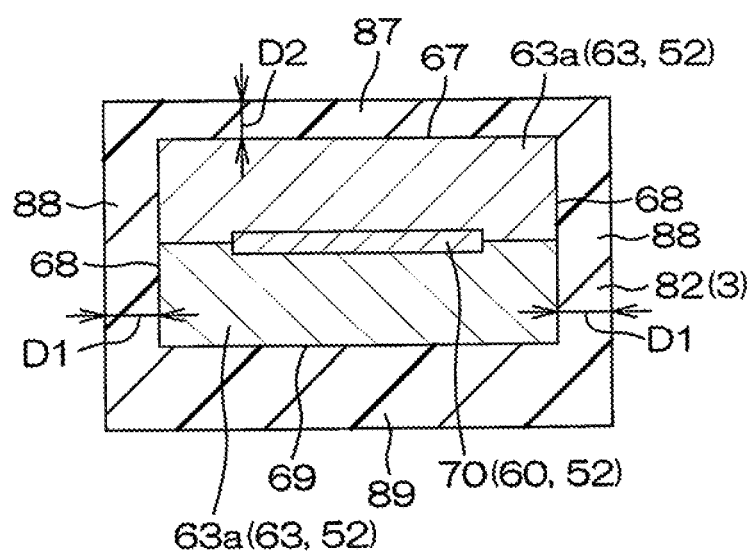
FIG. 4 is a schematic sectional view taken along line IV-IV in FIG. 2.

FIG. 4 is a schematic sectional view taken along line IV-IV in FIG. 2. The holder 63 having a block shape has an upper surface 67, a pair of side surfaces 68, and a lower surface 69. The upper surface 67 of the holder 63 serves also as an upper surface of the second circuit portion 52. The side surfaces 68 of the holder 63 serve also as side surfaces of the second circuit portion 52. The lower surface 69 of the holder 63 serves also as a lower surface of the second circuit portion 52. The holder holding portion 82 includes an upper wall portion 87 with which the upper surface 67 of the holder 63 is covered, side wall portions 88 with which the side surfaces 68 of the holder 63 are covered, and a lower wall portion 89 with which the lower surface 69 of the holder 63 is covered. A width of each side wall portion 88 in a direction perpendicular to the side surfaces 68 (a thickness D1 of the side wall portion 88) is larger than a width of the upper wall portion 87 in a direction perpendicular to the upper surface 67 (a thickness D2 of the upper wall portion 87). The thickness D1 of the side wall portion 88 is preferably equal to or larger than 1.1 times of the thickness D2 of the upper wall portion 87.

Figure 5:
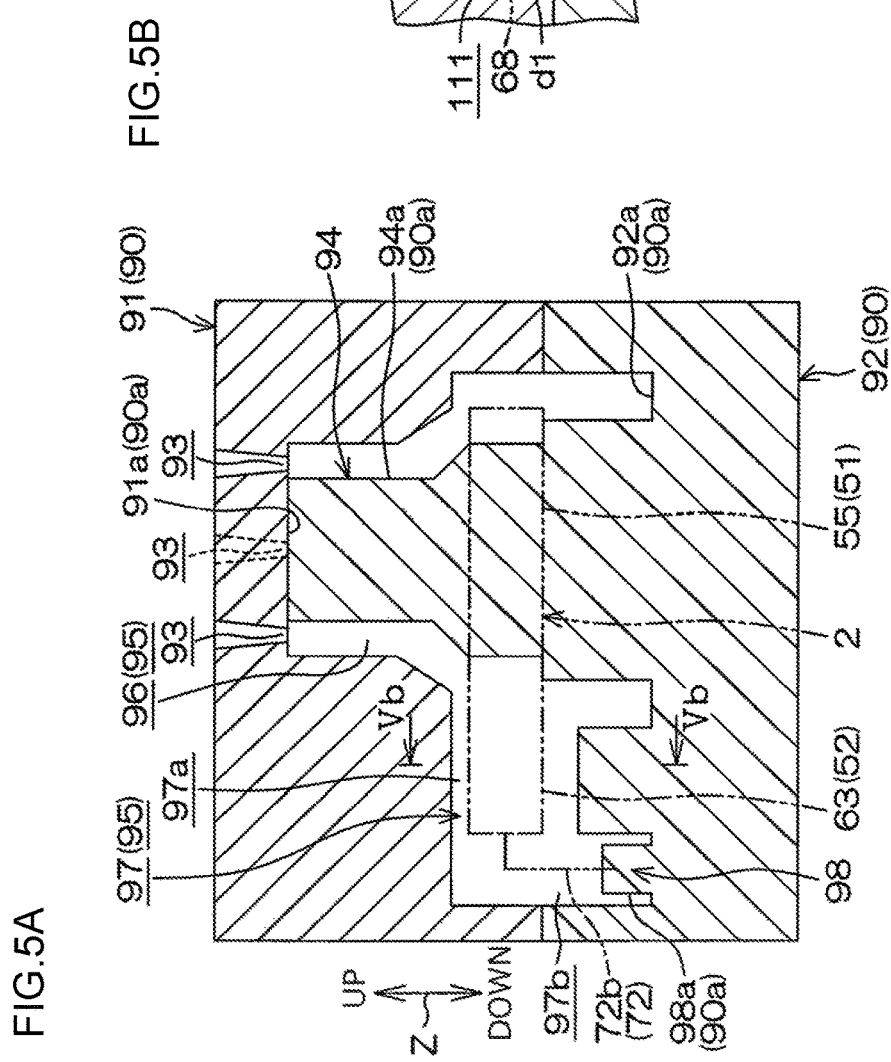
FIG. 5A is a schematic diagram illustrating a step of a method of manufacturing a housing structure.
FIG. 5B is a schematic sectional view taken along line Vb-Vb in FIG. 5A.

A method of manufacturing the housing structure 1 will be described below with reference to FIGS. 5A to 8B. FIG. 5A is a schematic diagram illustrating a step of the method of manufacturing the housing structure 1. FIG. 5B is a schematic sectional view taken along line Vb-Vb in FIG. 5A. First, as illustrated in FIG. 5A and FIG. 5B, a mold 90 for insert molding, in which the electronic unit 2 is to be housed, is prepared (preparing step). In FIG. 5A and FIG. 5B, the electronic unit 2 housed in the mold 90 is indicated by a long dashed double-short dashed line.

In FIG. 5A and FIG. 5B, the electronic unit 2 is illustrated with the configuration thereof omitted (this also applies to FIGS. 6 to 8B described later) for the sake of convenience. Specifically, in FIG. 5A and FIG. 5B, illustration of the magnetic convergence rings 53 and the magnetic shield 57 of the first circuit portion 51 and the magnetic elements 61, 62 and the electronic component 60 of the second circuit portion 52 is omitted, and the holder 63 and the magnetic convergence ring holders 55 are illustrated in the form of a single component.

As illustrated in FIG. 5A, the mold 90 includes an upper mold 91 and a lower mold 92 that face each other in an up-down direction Z. A lower surface of the upper mold 91 and an upper surface of the lower mold 92 face each other in the up-down direction Z. The mold 90 is closed when a part of the lower surface of the upper mold 91 and a part of the upper surface of the lower mold 92 come into contact with each other. The mold 90 is opened when the lower surface of the upper mold 91 and the upper surface of the lower mold 92 are separated from each other. The mold 90 has an internal space 95 that is defined by the lower surface of the upper mold 91 and the upper surface of the lower mold 92 while the mold 90 is closed. The lower surface of the upper mold 91 has a first uneven portion 91a that defines the internal space 95 from above. The upper surface of the lower mold 92 has a second uneven portion 92a that defines the internal space 95 from below.

The mold 90 includes a support portion 94 having a pillar shape and an internal-space forming portion 98. The support portion 94 protrudes upward from the upper surface of the lower mold 92, and can support the first circuit portion 51 of the electronic unit 2. The internal-space forming portion 98 protrudes upward from the upper surface of the lower mold 92 to form the internal space 83a (see FIG. 2) of the connector portion 83. When the mold 90 is closed, the support portion 94 and the internal-space forming portion 98 protrude toward the upper mold 91. When the mold 90 is closed, a surface 94a of the support portion 94, a surface 98a of the internal-space forming portion 98, the first uneven portion 91a, and the second uneven portion 92a constitute an inner wall surface 90a of the mold 90. The internal space 95 is defined by the inner wall surface 90a.

The internal space 95 includes a first chamber 96 and a second chamber 97. In a state where the electronic unit 2 is placed in the mold 90, the first circuit portion 51 is housed in the first chamber 96. In the state where the electronic unit 2 is placed in the mold 90, the second circuit portion 52 is housed in the second chamber 97 and the second chamber 97 is communicated with the first chamber 96. The state where the electronic unit 2 is placed in the mold 90 means a state where the first circuit portion 51 of the electronic unit 2 is supported by the support portion 94 and the mold 90 is closed. The support portion 94 supports the first circuit portion 51 from below.

The mold 90 includes a plurality of gates 93 through which a resin is injected into the first chamber 96. The gates 93 may be provided in positions at an uppermost portion of the first uneven portion 91a of the upper mold 91. The gates 93 are provided at such positions as to surround the support portion 94. The gates 93 are communicated with the first chamber 96. The second chamber 97 includes a holder forming portion 97a and a connector forming portion 97b. The second circuit portion 52 is housed in the holder forming portion 97a having a rectangular shape as viewed from the horizontal direction. The distal end portions of the second portions 72b of the terminals 72 extending from the holder 63 are housed in the connector forming portion 97b.

Unlike in the present embodiment, the upper mold 91 may include a protruding portion (not illustrated) that protrudes downward and comes into contact with an upper end portion of the support portion 94, and the gates 93 may be provided in a portion of the protruding portion, which comes into contact with the support portion 94. As illustrated in FIG. 5B, the inner wall surface 90a of the mold 90 includes an upper wall surface 100, a pair of side wall surfaces 101, and a lower wall surface 102. The upper wall surface 100 the holder forming portion 97a from above. The side wall surfaces 101 define the holder forming portion 97a from lateral sides. The lower wall surface 102 defines the holder forming portion 97a from below.

In the state where the electronic unit 2 is placed in the mold 90, the upper wall surface 100 faces the upper surface 67 of the second circuit portion 52 with a space left between the upper wall surface 100 and the upper surface 67, each side wall surface 101 faces the corresponding side surface 68 of the second circuit portion 52 with a space left between the side wall surface 101 and the side surface 68, and the lower wall surface 102 faces the lower surface 69 of the second circuit portion 52 with a space left between the lower wall surface 102 and the lower surface 69. The space between the upper wall surface 100 and the upper surface 67 of the second circuit portion 52 will be referred to as an upper flow channel 110. The space between each side wall surface 101 and the corresponding side surface 68 will be referred to as a side flow channel 111. The space between the lower wall surface 102 and the lower surface 69 of the second circuit portion 52 will be referred to as a lower flow channel 112.

Figure 6:
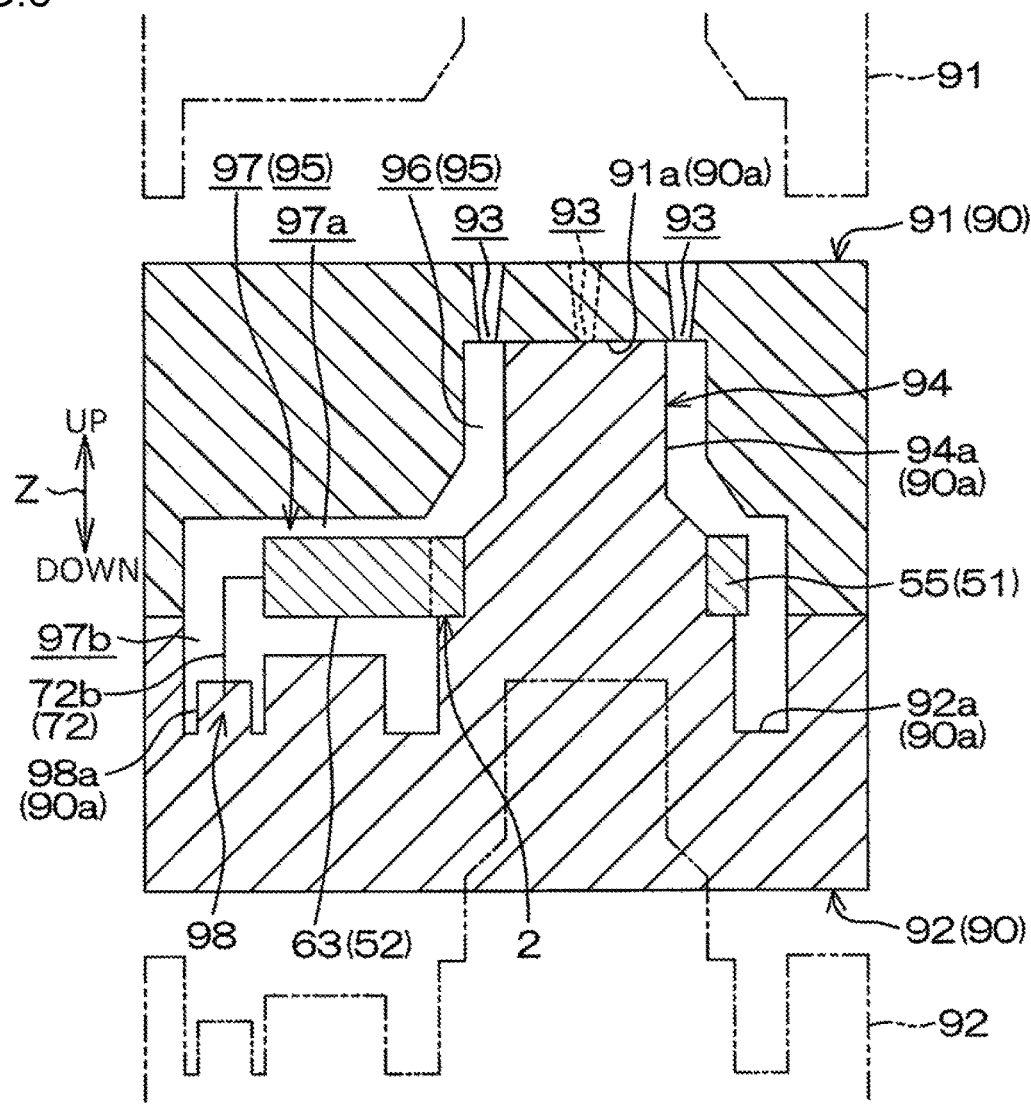
FIG. 6 is a schematic diagram illustrating a step subsequent to the step illustrated in FIG. 5A and FIG. 5B.

The mold 90 is designed such that, in the state where the electronic unit 2 is placed in the mold 90, a distance d1 between each side surface 68 of the second circuit portion 52 and the corresponding side wall surface 101 is longer than a distance d2 between the upper surface 67 of the second circuit portion 52 and the upper wall surface 100. FIG. 6 is a schematic diagram illustrating a step subsequent to the step illustrated in FIG. 5. As illustrated in FIG. 6, the electronic unit 2 is placed in the mold 90 (placing step). In FIG. 6, the upper mold 91 and the lower mold 92 in a state where the mold 90 is open are indicated by long dashed double-short dashed lines.

The electronic unit 2 is placed between the upper mold 91 and the lower mold 92, and the upper mold 91 and the lower mold 92 are moved to be closer to each other to close the mold 90. Consequently, the electronic unit 2 is placed in the mold 90 such that the inner peripheral surfaces of the magnetic convergence ring holders 55 of the first circuit portion 51 are supported by the support portion 94. In the state where the electronic unit 2 is placed in the mold 90, the second circuit portion 52 is not in contact with the inner wall surface 90a of the mold 90.

Figures 7A, 7B:
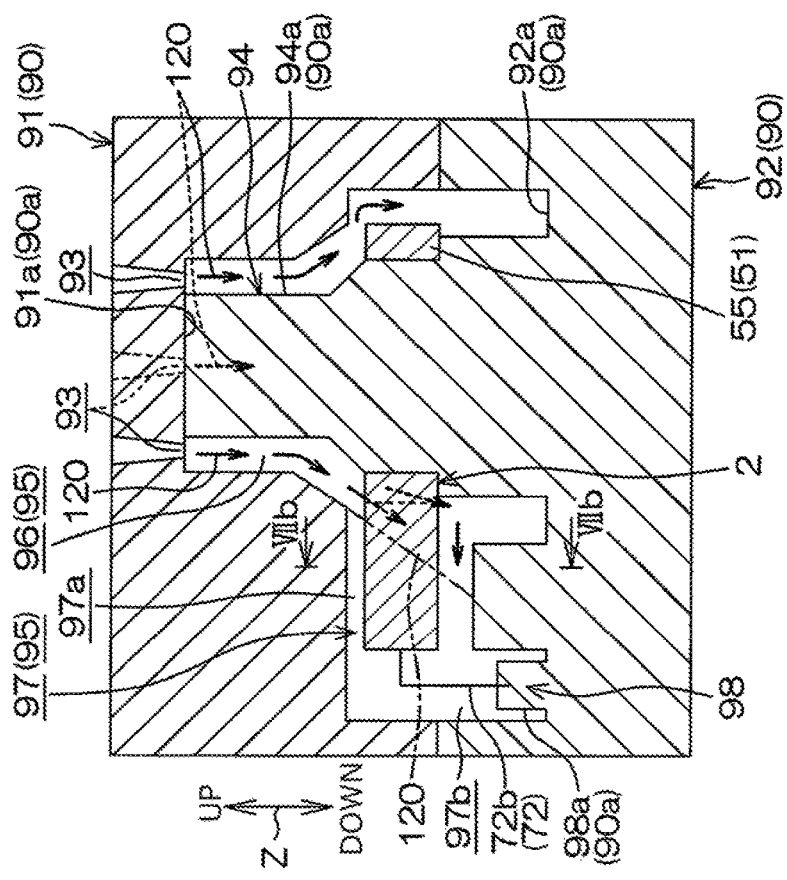
FIG. 7A is a schematic diagram illustrating a step subsequent to the step illustrated in FIG. 6.
FIG. 7B is a schematic sectional view taken along line VIIb-VIIb in FIG. 7A.

FIG. 7A is a schematic diagram illustrating a step subsequent to the step illustrated in FIG. 6. FIG. 7B is a schematic sectional view taken along line VIIb-VIIb in FIG. 7A. As illustrated in FIG. 7A and FIG. 7B, a resin 120 in a molten state is injected into the mold 90 in which the electronic unit 2 has been placed (injecting step). The resin 120 is injected into the first chamber 96 from the gates 93 (see thick arrows in FIG. 7A). The resin 120 injected into the first chamber 96 flows into the second chamber 97 from an upper portion of the second circuit portion 52, and then flows through the upper flow channel 110, the side flow channels 111, and the lower flow channel 112. A space between the mold 90 and the electronic unit 2 is filled with the resin 120. FIG. 7A and FIG. 7B illustrate a state where the resin 120 is being injected into the mold 90. Specifically, FIG. 7A and FIG. 7B illustrate a state where the resin 120 is flowing into the second chamber 97. The resin 120 that has been introduced into the second chamber 97 is indicated by a long dashed double-short dashed line.

Where the volumetric flow rate of the resin 120 flowing through the second chamber 97 is denoted by Q, the viscosity of the resin 120 is denoted by μ, half the width (flow channel width) of the flow channel through which the resin 120 flows is denoted by b, and the pressure of the resin 120 is denoted by P, the volumetric flow rate Q can be expressed by Equation (1) based on the two-dimensional Poiseuille flow.

$$Q = -(2b^3/3\,\mu) \times \Delta P \quad (1)$$

In Equation (1), a flow resistance R of the resin 120 flowing through the second chamber 97 is denoted by $3\mu/2b^3$ (see Equation (2) below). Based on Equation (1) and Equation (2), the volumetric flow rate Q can be expressed by Equation (3) using the flow resistance R.

$$R = 3\,\mu/2b^3 \quad (2)$$

$$Q = -\Delta P/R \quad (3)$$

As indicated by Equation (3), the absolute value of the volumetric flow rate Q decreases with an increase in the flow resistance R, and the absolute value of the volumetric flow rate Q increases with a decrease in the flow resistance R. As indicated by Equation (2), the flow resistance R decreases with an increase in the flow channel width, and the flow resistance R increases with a decrease in the flow channel width.

Next, each of the distance d1 and the distance d2 in the present embodiment is used as the flow channel width, and a flow resistance R1 of the resin 120 flowing through each of the side flow channels 111 and a flow resistance R2 of the resin 120 flowing through the upper flow channels 110 will be compared with each other. The flow resistance R1 is expressed by Equation (4), and the flow resistance R2 is expressed by Equation (5).

$$R1 = 12\,\mu/(d1)^3 \quad (4)$$

$$R2 = 12\,\mu/(d2)^3 \quad (5)$$

As described above, the distance d1 is longer than the distance d2. Thus, the flow resistance R1 of the resin 120 flowing through each of the side flow channels 111 is lower than the flow resistance R2 of the resin 120 flowing through the upper flow channel 110 (R1<R2). With this configuration, when the injected resin 120 flows from the first chamber 96 into the second chamber 97, the injected resin 120 flows into the side flow channels 111 before the upper flow channel 110 is filled with the resin 120.

Figure 8B:
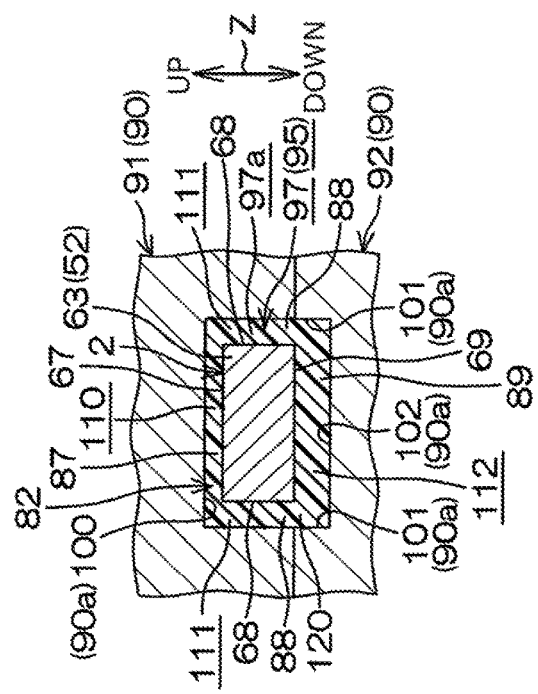
FIG. 8B is a schematic sectional view taken along line VIIIb-VIIIb in FIG. 8A.
Figure 8A:
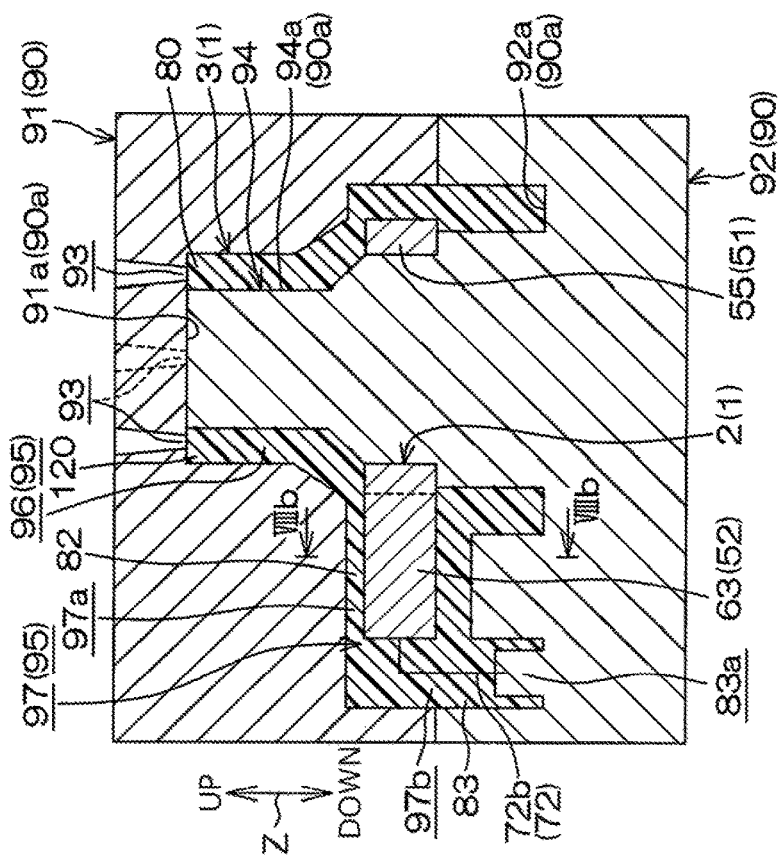
FIG. 8A is a schematic diagram illustrating a step subsequent to the step illustrated in FIG. 7A and FIG. 7B.

FIG. 8A is a schematic diagram illustrating a step subsequent to the step illustrated in FIG. 7A and FIG. 7B. FIG. 8B is a schematic sectional view taken along line VIIIb-VIIIb in FIG. 8A. As illustrated in FIG. 8A and FIG. 8B, in a state where the mold 90 is filled with the resin 120, the resin 120 is cooled via the mold 90 to be solidified (cooling step). Consequently, the housing 3 is formed so as to be integral with the electronic unit 2.

Specifically, as illustrated in FIG. 8A, when the resin 120 supplied into the first chamber is solidified, the main body portion 80 of the housing 3 is formed. When the resin 120 supplied into the holder forming portion 97a of the second chamber 97 is solidified, the holder holding portion 82 of the housing 3 is formed. When the resin 120 supplied into the connector forming portion 97b of the second chamber 97 is solidified, the connector portion 83 of the housing 3 is formed.

Specifically, as illustrated in FIG. 8B, when the resin 120 supplied into the upper flow channel 110 is solidified, the upper wall portion 87 of the holder holding portion 82 of the housing 3 is formed. When the resin 120 supplied into the side flow channels 111 is solidified, the side wall portions 88 of the holder holding portion 82 are formed. When the resin 120 supplied into the lower flow channel 112 is solidified, the lower wall portion 89 of the holder holding portion 82 is formed. The mold 90 is opened in the up-down direction Z, and the housing 3 and the electronic unit 2, which are molded integrally as a single component, are taken out from the mold 90 (taking-out step). Consequently, the housing structure 1 including the electronic unit 2 and the housing 3, in which the electronic unit 2 is housed, is completed. The electronic unit 2 and the housing 3 are integrally molded into a single component.

In the present embodiment, the mold 90 for insert molding, in which the electronic unit 2 is housed, is configured such that the flow resistance R1 of the resin 120 flowing through the space between each side surface 68 of the second circuit portion 52 and the corresponding side wall surface 101 (i.e., each side flow channel 111) is lower than the flow resistance R2 of the resin 120 flowing through the space between the upper surface 67 of the second circuit portion 52 and the upper wall surface 100 (i.e., the upper flow channel 110). Thus, the resin 120 injected into the mold 90, in which the electronic unit 2 has been placed, flows into the space between each side surface 68 of the second circuit portion 52 and the corresponding side wall surface 101 before the space between the upper surface 67 of the second circuit portion 52 and the upper wall surface 100 is filled with the resin 120. This enables a reduction in the force (resin pressure) to be applied to the second circuit portion 52 protruding from the first circuit portion 51, from the resin 120 introduced into the space between the upper surface 67 of the second circuit portion 52 and the upper wall surface 100. Consequently, deformation of the second circuit portion 52 can be suppressed. That is, it is possible to integrally mold the electronic unit 2 and the housing 3, in which the electronic unit 2 is housed, into a single component, while suppressing deformation of the electronic unit 2 during the insert molding.

As described in the present embodiment, the mold 90 is prepared such that the distance d1 between each side surface 68 of the second circuit portion 52 and the corresponding side wall surface 101 is longer than the distance d2 between the upper surface 67 of the second circuit portion 52 and the upper wall surface 100. Consequently, the flow resistance R1 of the resin 120 flowing through the space between each side surface 68 of the second circuit portion 52 and the corresponding side wall surface 101 can be made lower than the flow resistance R2 of the resin 120 flowing through the space between the upper surface 67 of the second circuit portion 52 and the upper wall surface 100.

In the present embodiment, the resin 120 injected into the first chamber 96 through the gates 93 flows into the second chamber 97 from the upper portion of the second circuit portion 52. Thus, the resin 120 flowing into the space between the upper surface 67 of the second circuit portion 52 and the upper wall surface 100 flows into the space between each side surface 68 of the second circuit portion 52 and the corresponding side wall surface 101 before the space between the upper surface 67 of the second circuit portion 52 and the upper wall surface 100 is filled with the resin 120. As a result, in the configuration in which the resin 120 flows into the second chamber 97 from the upper portion of the second circuit portion 52, it is possible to suppress deformation of the second circuit portion 52 due to a force applied to the second circuit portion 52 from the resin 120 supplied to the space between the upper surface 67 of the second circuit portion 52 and the upper wall surface 100.

The gates are usually provided in the upper portion of the upper mold of the mold, and it is difficult to change the positions of the gates. However, in the present embodiment, the gates 93 are provided in the first uneven portion 91a of the upper mold 91. Thus, the mold 90 can be prepared without any significant change in the structure of a commonly-used mold. In the state where the electronic unit 2 is placed in the mold 90, the second circuit portion 52 is not in contact with the inner wall surface 90a of the mold 90. Thus, the resin 120 injected into the mold 90, in which the electronic unit 2 has been placed, passes through the space between each side surface 68 of the second circuit portion 52 and the corresponding side wall surface 101 and then flows into a space below the second circuit portion 52 to fill the space between the second circuit portion 52 and the inner wall surface 90a (the lower wall surface 102) positioned below the second circuit portion 52, before the space between the upper surface 67 of the second circuit portion 52 and the upper wall surface 100 is filled with the resin 120. Thus, the resin 120 that has flowed into the space below the second circuit portion 52 supports the second circuit portion 52, thereby suppressing downward deformation of the second circuit portion 52.

The electronic unit 2 is disposed such that the inner peripheral surfaces of the magnetic convergence ring holders 55 are supported by the support portion 94 protruding into the mold 90. This facilitates positioning of the electronic unit 2 with respect to the mold 90. Therefore, it is possible to easily place the electronic unit 2 in the mold 90 such that the distance d1 between each side surface 68 of the second circuit portion 52 of the electronic unit 2 and the corresponding side wall surface 101 is longer than the distance d2 between the upper surface 67 of the second circuit portion 52 and the upper wall surface 100.

According to the present configuration, the holder 63 can be made more compact and thus the amount of resin used to form the holder 63 can be made smaller, than in the configuration in which the thickness of the holder 63 is increased to improve the rigidity thereof, thereby suppressing deformation of the second circuit portion 52. The invention is not limited to the above-described embodiment, but various changes may be made to the above-described embodiment within the scope of claims.

Figure 9:
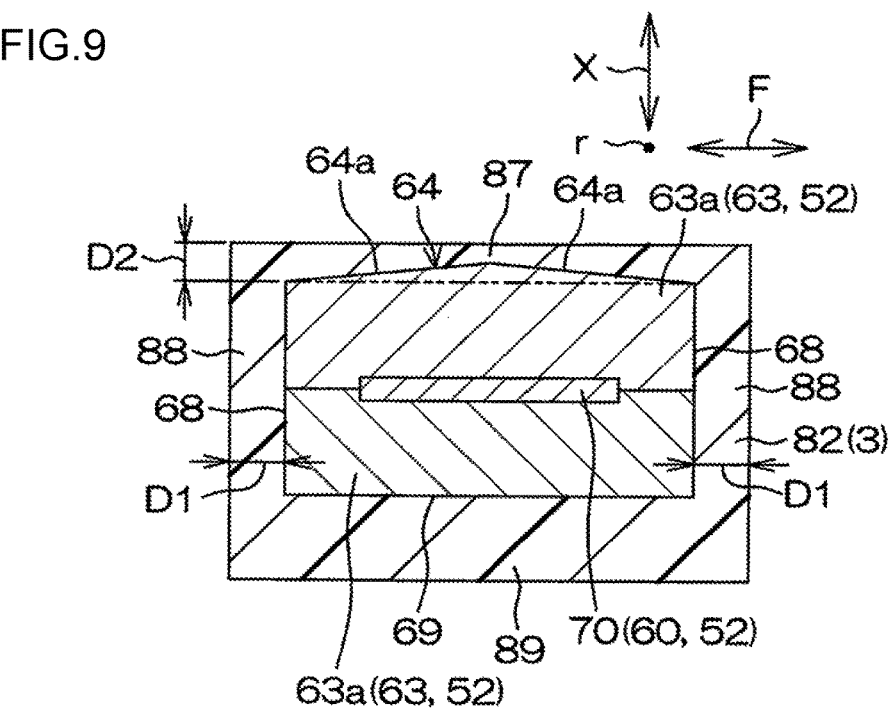
FIG. 9 is a sectional view of a second circuit portion of an electronic unit of a housing structure and its surroundings according to a modified example.

For example, unlike in the above-described embodiment, the second circuit portion 52 may include a tapered portion 64 in addition to the holder 63, as illustrated in FIG. 9. The holder 63 extends radially outward from the first circuit portion 51 and serves as a main body portion. The tapered portion 64 protrudes from the holder 63 in a direction in which the central axis C1 of the first circuit portion 51 extends (axial direction X). The tapered portion 64 has a triangle shape as viewed from the radial direction r. The tapered portion 64 includes a pair of slanted surfaces 64a slanted in opposite directions with respect to an opposing direction F in which the side surfaces 68 are opposed to each other. The slanted surfaces 64a are slanted with respect to the opposing direction F such that the slanted surfaces 64a extend to the corresponding side surfaces 68 from the vertex of the triangle shape of the tapered portion 64. The tapered portion 64 is provided in the entire region of the holder 63 in a direction in which the holder 63 extends (the radial direction r).

The slanted surfaces 64a of the tapered portion 64 serve also as the upper surface of the second circuit portion 52. The side surfaces 68 of the holder 63 also serve as the side surfaces of the second circuit portion 52. The lower surface 69 of the holder 63 also serves as the lower surface of the second circuit portion 52. The slanted surfaces 64a of the tapered portion 64 are covered with the upper wall portion 87 of the holder holding portion 82. The thickness D1 of each side wall portion 88 is larger than the thickness D2 of the upper wall portion 87. In this modified example, the thickness D2 of the upper wall portion 87 means a dimension of the upper wall portion 87 in a direction (the axial direction X) perpendicular to the opposing direction F. The thickness D2 of the upper wall portion 87 is largest at both end portions of the upper wall portion 87 in the opposing direction F. The thickness D1 of each side wall portion 88 is larger than the thickness D2 of the upper wall portion 87 at the both end portions thereof in the opposing direction F.

Figure 10:
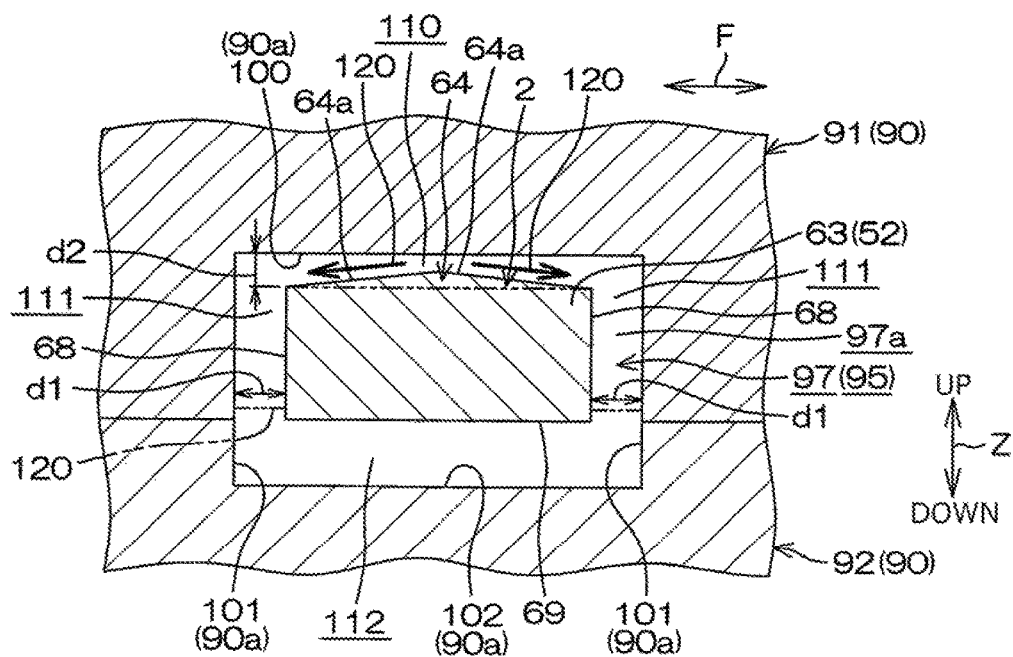
FIG. 10 is a schematic diagram illustrating a step of a method of manufacturing the housing structure according to the modified example illustrated in FIG. 9, the step being a step of injecting a resin into a mold in which the electronic unit has been placed.

In a method of manufacturing the housing structure 1 according to this modified example, the electronic unit 2 is placed in the mold 90 with the tapered portion 64 facing upward. Consequently, the upper wall surface 100 of the mold 90 and the tapered portion 64 that is tapered upward face each other (see FIG. 10). In a state where the electronic unit 2 is placed in the mold 90, the distance d1 between each side surface 68 of the second circuit portion 52 and the corresponding side wall surface 101 is longer than the distance d2 between each slanted surface 64a of the tapered portion 64 and the upper wall surface 100. The distance d2 is a distance between each slanted surface 64a and the upper wall surface 100 in the direction perpendicular to the opposing direction F. The distance d2 is largest at the both end portions of the tapered portion 64 in the opposing direction F. The distance d1 is longer than the distance d2 between each of the both end portions of the tapered portion 64 in the opposing direction F and the upper wall surface 100.

According to this manufacturing method, the electronic unit 2 is housed in the mold 90 with the tapered portion 64 facing upward. Consequently, the upper wall surface 100 of the mold 90 faces the upper surface of the second circuit portion 52, which is constituted by the tapered portion 64. Thus, in the injecting step, the resin 120 having flowed into a space between the upper wall surface 100 of the mold 90 and the tapered portion 64 (the upper surface of the second circuit portion 52) flows along the tapered portion 64 in directions slanted with respect to the horizontal direction (the opposing direction F) (see thick arrows in FIG. 10). With this configuration, it is possible to disperse the force applied to the second circuit portion 52 protruding from the first circuit portion 51, from the resin supplied into the space between the tapered portion 64 (the upper surface of the second circuit portion 52) and the upper wall surface 100. Thus, deformation of the second circuit portion 52 can be suppressed.

The tapered portion 64 need not be formed in the entire region of the holder 63 in the opposing direction F, and may be formed near the center of the holder 63 in the opposing direction F. For example, unlike in the above-described modified example, the upper surface of the second circuit portion 52 may be constituted by a pair of slanted surfaces 64a of the tapered portion 64 and flat surfaces provided outward of the slanted surfaces 64a in the opposing direction F. The tapered portion 64 may be provided on a part of the holder 63 in the direction in which the holder 63 extends (the radial direction r). The tapered portion 64 may have a trapezoidal shape with its shorter base located above its longer base in the up-down direction the holder 63 as viewed from the radial direction r.

Unlike in the above-described embodiment, in the state where the electronic unit 2 is placed in the mold 90, the second circuit portion 52 may be supported by the lower mold 92 (circuit support portion) of the mold 90 by coming into contact with the lower wall surface 102 of the mold 90. For example, a distal end of the second circuit portion 52, which is on the opposite side of the second circuit portion 52 from the first circuit portion 51, may be partially in contact with the lower wall surface 102 of the mold 90. In this case, a central portion of the second circuit portion 52 in the radial direction r (in the direction in which the second circuit portion 52 extends) is not supported by the lower mold 92. However, even in this case, when the mold 90 is designed such that the distance d1 between each side surface 68 of the second circuit portion 52 and the corresponding side wall surface 101 is larger than the distance d2 between the upper surface 67 of the second circuit portion 52 and the upper wall surface 100, the central portion of the second circuit portion 52 in the radial direction r can be suppressed from being deformed downward.

As described above, in the injecting step, the resin is injected into the mold 90 with the second circuit portion 52 supported by the lower mold 92 (circuit support portion) of the mold 90 from below. According to this manufacturing method, downward deformation of the second circuit portion 52 can be further suppressed. However, when the electronic unit 2 is used as the torque sensor 4 as in the above-described embodiment, the housing 3 needs to be formed such that entry of a liquid into a gap between the electronic unit 2 and the housing 3 is prevented. Thus, in the state where the electronic unit 2 is placed in the mold 90, the second circuit portion 52 is preferably not in contact with the inner wall surface 90a of the mold 90.

Thus, in the state where the electronic unit 2 used as the torque sensor 4 is placed in the mold 90, the second circuit portion 52 is supported by the mold 90. Therefore, a circuit support portion, such as a pin that is movable in the mold 90 (not illustrated), may be used. The second circuit portion 52 may be supported by the circuit support portion from below, and the position of the circuit support portion may be controlled such that the circuit support portion moves away from the second circuit portion 52 after the mold 90 is filled with the resin 120 and before the resin 120 is solidified. Consequently, the resin flows into an area in the mold 90 (in the internal space 95), in which the circuit support portion was placed. Therefore, the housing 3 can be formed without providing a hole in the holder holding portion 82.

Figure 11:
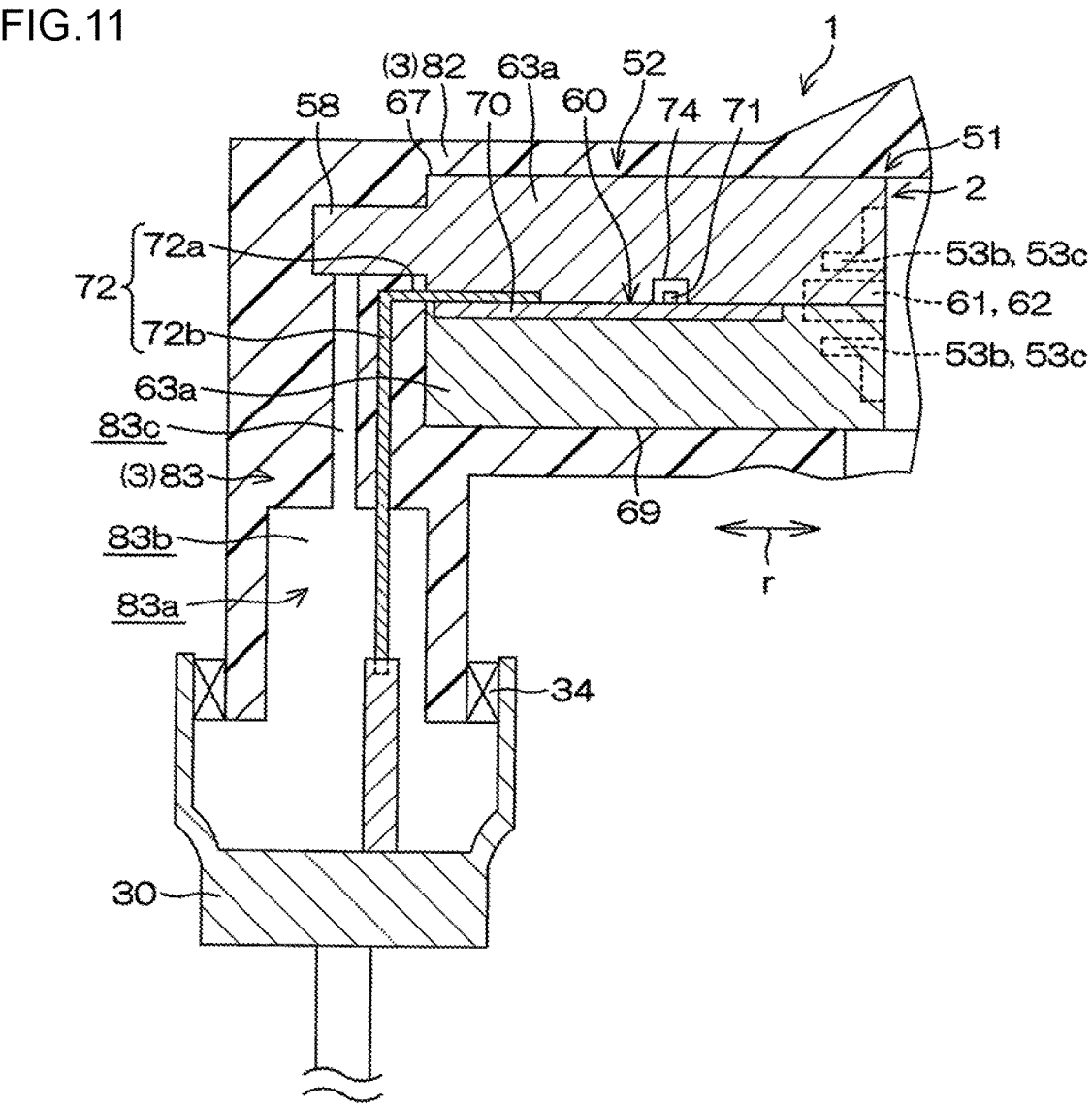
FIG. 11 is a sectional view of a second circuit portion of an electronic unit of a housing structure according to a modified example other than the modified example illustrated in FIG. 9.
Figure 12:
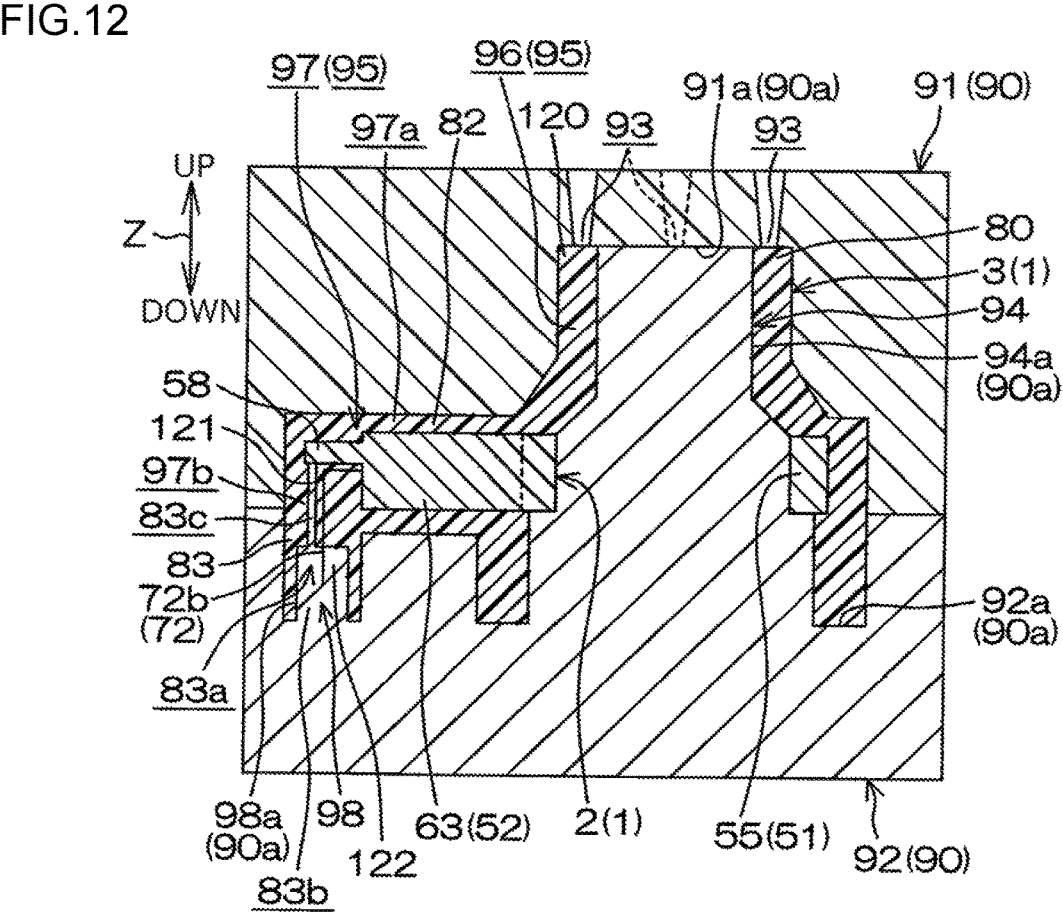
FIG. 12 is a schematic diagram illustrating a step of a method of manufacturing the housing structure according to the modified example illustrated in FIG. 11, the step being a step of injecting a resin into a mold in which the electronic unit has been placed.

A housing structure 1 according to a modified example illustrated in FIG. 11 and FIG. 12 is an example of the housing structure 1 configured to suppress downward deformation of the second circuit portion 52 and prevent entry of a liquid into a gap between the electronic unit 2 and the housing 3, that is, the housing structure 1 having a sufficient waterproof property. As illustrated in FIG. 11, the second circuit portion 52 of the electronic unit 2 of the housing structure 1 according to this modified example includes, in addition to the terminals 72, an extending portion 58 exposed into the internal space 83a in the connector portion 83, as a portion supported by the internal-space forming portion 98 (see FIG. 12). The extending portion 58 is molded so as to be integral with at least one of the halves 63a of the holder 63. The extending portion 58 extends radially outward from a radially outer end of the holder 63. The extending portion 58 extends to a position radially outward of the terminals 72 (toward a position on the opposite side of the second circuit portion 52 from the first circuit portion 51). In other words, the extending portion 58 is a distal end portion of the second circuit portion 52. The extending portion 58 need not be entirely exposed into the internal space 83a, as long as the extending portion 58 has a surface that can be seen, as viewed from an opening side of the internal space 83a of the connector portion 83. The internal space 83a includes a terminal housing chamber 83b and an exposure portion 83c. The exposure portion 83c extends from an upper end of the terminal housing chamber 83b to the extending portion 58 of the second circuit portion 52. The exposure portion 83c allows the extending portion 58 to be exposed to the outside via the internal space 83a.

As illustrated in FIG. 12, in a method of manufacturing the housing structure 1 according to this modified example, the internal-space forming portion 98 for forming the internal space 83a of the connector portion 83 serves as a circuit support portion that can support the second circuit portion 52 from below. The internal-space forming portion 98 of the mold 90 used in this manufacturing method includes a housing chamber forming portion 122 and a contact portion 121. The housing chamber forming portion 122 is used to form the terminal housing chamber 83b, in which the distal end portions of the second portions 72b of the terminals 72 are housed, in the internal space 83a of the connector portion 83. The contact portion 121 extends upward from an upper end of the housing chamber forming portion 122 and comes into contact with the second circuit portion 52.

In a preparing step of the method of manufacturing the housing structure 1 according to this modified example, the mold 90 including the internal-space forming portion 98 that can support the second circuit portion 52 from below is prepared. In an injecting step, the resin 120 is injected into the mold 90 with the extending portion 58 supported by the internal-space forming portion 98. Thus, even when the resin in the mold 90 is solidified with the second circuit portion 52 supported by the internal-space forming portion 98 as illustrated in FIG. 12, the second circuit portion 52 is just exposed to the outside via the connector portion 83 as illustrated in FIG. 11. After the housing structure 1 is manufactured, the connector portion 83 and the connector 30 having a waterproof property are fitted together to close the opening of the connector portion 83. With this configuration, the housing structure 1 is easily kept watertight. Therefore, the externally exposed portion of the second circuit portion 52 need not be subjected to a waterproof treatment other than the fitting of the connector 30 and the connector portion 83.

After the resin is injected into the mold 90 and before the resin is solidified, the internal-space forming portion 98 may be separated from the second circuit portion 52, so that an area in the mold 90 in which the contact portion 121 of the internal-space forming portion 98 was placed can be filled with the resin. However, because the water-tightness can be ensured by fitting the connector 30 and the connector portion 83 together, the internal-space forming portion 98 need not be separated from the second circuit portion 52.

As described above, deformation of the electronic unit 2 during insert molding can be suppressed, and the housing structure 1 can be easily kept watertight. The internal-space forming portion 98 includes the housing chamber forming portion 122 and the contact portion 121. Thus, the contact portion 121 is formed so as to be smaller than the housing chamber forming portion 122 with respect to the horizontal direction. This makes it possible to easily keep the housing structure 1 watertight without enlarging the internal space 83a of the connector portion 83 more than necessary.

Unlike in the present embodiment, the electronic unit 2 need not be used as the torque sensor 4 attached to the second pinion shaft 8. For example, the electronic unit 2 may be used as a torque sensor attached to the steering shaft 11 or as another in-vehicle device. The electronic unit may be used as a device other than an in-vehicle device, and is applicable to any housing structures including the electronic unit and a housing, in which the electronic unit is housed, that are integrally molded as a single component.

As expressed by Equation (4) and Equation (5) described above, the viscosity μ of the resin 120 flowing through the mold 90 can be partially changed. This allows the flow resistance R1 of the resin 120 flowing through each of the side flow channels 111 to be made lower than the flow resistance R2 of the resin 120 flowing through the upper flow channel 110. Specifically, the temperature of the vicinity of the side flow channels 111 (particularly, the side wall surfaces 101 defining the side flow channels 111) may be increased to reduce the viscosity μ of the resin 120 flowing through the side flow channels 111, so that the flow resistance R1 is reduced.

What is claimed is:

1. A method of manufacturing a housing structure that includes an electronic unit including a first circuit portion and a second circuit portion protruding from the first circuit portion, and a housing in which the electronic unit is housed, the electronic unit and the housing being integral with each other, the method comprising:
preparing a mold for insert molding in which the electronic unit is housed, the mold including an upper wall surface facing an upper surface of the second circuit portion and side wall surfaces facing side surfaces of the second circuit portion, the mold being configured such that a flow resistance of a resin flowing through a space between each of the side surfaces of the second circuit portion and the corresponding side wall surface is lower than a flow resistance of the resin flowing through a space between the upper surface of the second circuit portion and the upper wall surface;
placing the electronic unit in the mold; and
injecting the resin into the mold in which the electronic unit has been placed, wherein
the second circuit portion is supported, as a cantilever portion, by the first circuit portion, and
the second circuit portion is not in contact with an inner wall surface of the mold in a state where the electronic unit is placed in the mold.

2. The method according to claim 1, wherein a distance between each of the side surfaces of the second circuit portion and the corresponding side wall surface is longer than a distance between the upper surface of the second circuit portion and the upper wall surface.

3. The method according to claim 1, wherein the mold includes:
a first chamber in which the first circuit portion of the electronic unit is housed;
a second chamber in which the second circuit portion of the electronic unit is housed, the second chamber being communicated with the first chamber; and a gate through which the resin is injected into the first chamber, and the resin injected into the first chamber through the gate flows into the second chamber from an upper portion of the second circuit portion.

4. The method according to claim 1, wherein the electronic unit is used as a torque sensor mounted in a vehicle, the first circuit portion of the electronic unit includes a magnetic convergence ring having an annular shape and a magnetic convergence ring holder surrounding the magnetic convergence ring, and the second circuit portion of the electronic unit includes an electronic circuit portion including an electronic component.

5. The method according to claim 1, wherein the mold that is prepared includes the upper wall surface facing the upper surface of the second circuit portion, the upper surface being constituted by a tapered portion tapered upward.

6. The method according to claim 1, wherein the mold includes a circuit support portion configured to support the second circuit portion, and the resin is injected into the mold in a state where the second circuit portion is supported by the circuit support portion from below.

7. The method according to claim 6, wherein the circuit support portion includes an internal-space forming portion configured to form, in the housing, an internal space of a connector portion configured to be fitted to a connector having a waterproof property, and the resin injected into the mold is solidified in a state where the second circuit portion is supported by the internal-space forming portion.

8. A method of manufacturing a housing structure that includes an electronic unit including a first circuit portion and a second circuit portion protruding from the first circuit portion, and a housing in which the electronic unit is housed, the electronic unit and the housing being integral with each other, the method comprising:

preparing a mold for insert molding in which the electronic unit is housed, the mold including an upper wall surface facing an upper surface of the second circuit portion and side wall surfaces facing side surfaces of the second circuit portion, the mold being configured such that a flow resistance of a resin flowing through a space between each of the side surfaces of the second circuit portion and the corresponding side wall surface is lower than a flow resistance of the resin flowing through a space between the upper surface of the second circuit portion and the upper wall surface;

placing the electronic unit in the mold; and injecting the resin into the mold in which the electronic unit has been placed, wherein the electronic unit is used as a torque sensor mounted in a vehicle, the first circuit portion of the electronic unit includes a magnetic convergence ring having an annular shape and a magnetic convergence ring holder surrounding the magnetic convergence ring, the second circuit portion of the electronic unit includes an electronic circuit portion including an electronic component, and the electronic unit is placed in the mold such that an inner peripheral surface of the magnetic convergence ring holder is supported by a support portion protruding in the mold.

* * * * *